United States Patent
Armstrong (12)

(10) Patent No.: US 9,538,615 B1
(45) Date of Patent: Jan. 3, 2017

(54) SYSTEM AND METHOD FOR OPTIMAL DISTRIBUTION OF LIGHT ON A PLANT

(71) Applicant: Daniel Armstrong, Batesville, IN (US)

(72) Inventor: Daniel Armstrong, Batesville, IN (US)

(*) Notice: Subject to any disclaimer, the term of this patent is extended or adjusted under 35 U.S.C. 154(b) by 0 days.

(21) Appl. No.: 15/071,556

(22) Filed: Mar. 16, 2016

(51) Int. Cl.
| | |
|---|---|
| A01G 9/02 | (2006.01) |
| A47G 35/00 | (2006.01) |
| H05B 37/02 | (2006.01) |
| A01G 7/04 | (2006.01) |
| A01G 27/00 | (2006.01) |
| A01G 9/20 | (2006.01) |
| A01G 9/12 | (2006.01) |
| G05B 15/02 | (2006.01) |

(52) U.S. Cl.
CPC ............ *H05B 37/0227* (2013.01); *A01G 7/045* (2013.01); *A01G 9/12* (2013.01); *A01G 9/20* (2013.01); *A01G 27/003* (2013.01); *G05B 15/02* (2013.01); *H05B 37/0272* (2013.01)

(58) Field of Classification Search
CPC .... A47G 33/06; A47G 7/085; F21W 2121/00; A41G 1/005; B65D 85/52; A01G 31/04; A01G 31/02; G02B 6/0008
USPC ......... 47/72, 67, 65; 362/605, 565, 567, 568
See application file for complete search history.

(56) References Cited

U.S. PATENT DOCUMENTS

| | | | |
|---|---|---|---|
| 6,921,182 B2 | 7/2005 | Anderson, Jr. et al. | |
| 7,401,437 B2 | 7/2008 | Dumont | |
| 8,443,546 B1 | 5/2013 | Darin | |
| 2002/0184820 A1 | 12/2002 | Mauney | |
| 2008/0148633 A1* | 6/2008 | Singh | A01G 7/00 47/65 |
| 2009/0199470 A1 | 8/2009 | Capen | |

* cited by examiner

*Primary Examiner* — Minh D A
(74) *Attorney, Agent, or Firm* — Vincent G. LoTempio; Kloss, Stenger & LoTempio; David T. Stephenson

(57) ABSTRACT

A system and method for optimal distribution of light on a plant ensures much of the plant receives uniform light during growth, including shadow regions of the plant. Multiple light sources position along the length of the plant. The lumen output of the light sources is incrementally varied. The position of the plant relative to the light sources horizontally and rotatably incrementally adjusts as the plant grows. A platform moves the plant horizontally relative to the plant. The platform rotates to orient the plant toward the light. Principles of inverse square law are used to adjust the distance and orientation of the plant relative to the light sources. Energy savings occur since lumen output is adjustable to match plant growth. Environmental sensors monitor environmental condition proximal to the plant, length of the plant, and distance between plant and light source to dictate operation of the light sources and platform.

20 Claims, 12 Drawing Sheets

SYSTEM AND METHOD FOR OPTIMAL DISTRIBUTION OF LIGHT ON A PLANT

FIELD OF THE INVENTION

The present invention relates generally to a system and method for optimal distribution of light on a plant. More so, a system and method is configured to align a plurality of light sources along the length of a plant, and remotely adjust the light intensity on the plant and position of the plant to achieve uniform light distribution on the plant, create optimal photosynthesis conditions, and enable efficient consumption of energy resources during the growth of the plant.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that an artificial light source for plants is generally an electric light, designed to stimulate plant growth by emitting an electromagnetic spectrum appropriate for photosynthesis. Grow lights are used in applications where there is either no naturally occurring light, or where supplemental light is required. For example, in the winter months when the available hours of daylight may be insufficient for the desired plant growth, lights are used to extend the time the plants receive light. If plants do not receive enough light, they will grow long and spindly.

Grow lights either attempt to provide a light spectrum similar to that of the sun, or to provide a spectrum that is more tailored to the needs of the plants being cultivated. Outdoor conditions are mimicked with varying color, temperatures and spectral outputs from the grow light, as well as varying the lumen output (intensity) of the lamps. Depending on the type of plant being cultivated, the stage of cultivation (e.g., the germination/vegetative phase or the flowering/fruiting phase), and the photoperiod required by the plants, specific ranges of spectrum, luminous efficacy and color temperature are desirable for use with specific plants and time periods.

Typically, indoor growing requires that you simply place your required light source above your plant, and adjust its height as needed as the plant matures. However, problems can arise as the plant's height increases, so too does its overall distance from this light source, creating insufficient light intensities below the top of the plant's shadows. To compensate for this, the intensity of the wattage light source must be factored in. With this common set-up, the light output and the plant remained fixed, while the height of the light source is adjusted.

It is known that there are at least two factors which reduce artificial light to much of a plant. First, the upper portions of a plant often block light coming from above, preventing it from reaching lower portions of the plant. Second, light intensity greatly diminishes with increased distance as described by the inverse-square law. It is known that the inverse-square law states that as the distance from the light source is increased, the light intensity is diminished relative to the square of the distance. Therefore, a growing structure which alleviates these problems will greatly enhance the yield of a plant.

Other proposals have involved systems for artificial growth lights. The problem with these is that they do not automatically adjust to compensate for the incrementally increasing height of a plant. Even though the above cited artificial lighting systems meets some of the needs of the market, a plant lighting system that adjusts the light intensity and position of the plant based on readings from an infrared sensing device and a sound propagation device is still desired.

SUMMARY OF THE INVENTION

The present invention is directed to a system and method for optimal distribution of light on a plant. The system and method enables optimal distribution of light on a plant. The system and method enables optimal distribution of light on a plant to ensure that much of the plant receives uniform light during growth, including shadow regions of the plant where light does not reach. A plurality of light sources position along the length of the plant. The lumen output (light intensity) of the light sources is incrementally varied as the plant grows.

Further, the position of the plant relative to the light sources horizontally and rotatably incrementally adjusts on a platform as the plant grows. The platform moves the plant horizontally relative to the plant. The platform also rotates to orient the plant toward the light. Principles of inverse square law are used to vary the lumen output (light intensity), and the position of the plant relative to the light sources.

Energy savings occur since lumen output and powering on of the light sources is adjustable to match plant growth. At least one environmental sensor monitors at least one environmental condition proximal to the plant, the height of the plant, and the distance between the plant and the light source. The environmental sensor partially dictates operation of the light sources and the platform.

The frequency at which the light sources are powered on and off and the intensity at which the lumen output of the light sources is varied, and the movement and orientation of the plant relative to the light sources is generally incremental. This incrementalism allows the plant to react to the light source before the intensity and direction of illumination is variably controlled. Thus, the controllable and incremental variance in lighting and plant positioning helps increase the growth rate of the plant.

Further, the at least one environmental condition proximal to the plant, the length of the plant, the distance of the plant relative to the light source, and the orientation of the plant relative to the light source are constantly monitored and recorded by at least one environmental sensor, so as to help determine optimal lumen output and plant positioning.

In some embodiments, the system and method provides a plurality of light sources that align at an adjustable distance along the length of the plant. The number of light sources required for the system may be dictated by generally accepted illumination standards for specific plants. However, the operating costs of the system are significantly lower than conventional systems since a portion of the light sources may be powered off or operating a low lumen output, based on the height and position of the plant.

The light sources may include low wattage lamps. The light sources may be placed parallel with the length of the plant, at a spaced-apart adjustable distance that is efficacious for stimulating plant growth. The lumen output of the light sources are remotely regulated to adapt to the growth of the plant. Each light source operates independently, such that the lumen output and operation of the light sources synchronizes with the growth of the plant.

In some embodiments, a platform adjustably supports the plant. The plant positions on the platform at a predetermined distance and at a predetermined orientation from the light sources. The distance between the plant and the light sources, and the orientation of the plant relative to the light sources are coordinated with the lumen output of the light sources. The platform rotates and moves in a horizontal direction relative to the light sources. In this manner, the platform manipulates the plant during its growth based on the length of the plant and the environmental condition and general conditions of the plant. By adjusting the position of the plant, the normally shaded regions of the plant receive their share of light.

The system may further include an infrared sensing device to monitor and record the position of the plant relative to the light sources. The infrared sensing device communicates with a receiver, so as to determine the distance between the outer reaches of the plant and the light sources. The platform may be operated based on this communicative data between infrared sensing device, and receiver.

The system and method further comprises a control portion that regulates the light sources and the platform in synchronization with the growth of the plant. The control portion is also in communication with, and in control of at least one environmental sensor. The at least one environmental sensor is configured to detect and record at least one environmental condition proximal to the plant. The at least one environmental sensor may include, without limitation, a timer clock, a thermostat, at least one air sensor, a fan, and an image capturing device. Thus, the control portion is in communication with, and in control of: the plurality of light sources, the platform, and the at least one environmental sensor.

However, in one alternative embodiment, the timer clock regulates operation of the light sources, the platform, and the at least one environmental sensor. For example, the platform moves incrementally away from the light sources once a week, and rotates 360° over a 24 hour period.

In some embodiments, the control portion is configured to communicate with a communication device, such as a smart phone. The communication device may download a software application that enables the display of numerous interfaces for regulating and monitoring various aspects of the system and the plant. In one embodiment, the communication device may control the light sources and the platform. In another embodiment, the control portion may send messages to the communication device to indicate operational problems and dangerous plant environmental condition conditions. Further, the image of the plant, the light sources, and the platform that is captured by the image capturing device may be viewed through the communication device.

Thus, the system and method controls: 1) the number of operational light sources; 2) the lumen output of the light sources; 3) the rotational position of the plant relative to the light sources; and 4) the distance of the plant relative to the light sources. In this manner, optimal light distribution on the plant is achieved to create maximum photosynthesis conditions for stimulating plant growth. Furthermore, the amount of energy consumed is reduced since the light sources are not perpetually operational.

In one aspect, a system for optimal distribution of light, comprises:

a plurality of light sources, the plurality of light sources disposed in a spaced-apart relationship configured to enable a generally parallel alignment with a plant, each light source configured to power on and off independently, each light source further configured to independently generate a variable lumen output, whereby the powering on and off of the plurality of light sources, and the lumen output of the plurality of light sources is based at least partially on the height of the plant;

a platform, the platform configured to enable support of the plant, the platform further configured to move proximally and distally relative to the plurality of light sources, the platform further configured to rotate relative to the plurality of light sources, whereby the platform carries the plant proximally and distally in relation to the plurality of light sources based at least partially on the height of the plant, whereby the platform rotatably orients the plant in relation to the plurality of light sources based at least partially on the height of the plant;

an infrared sensing device, the infrared sensing device configured to record the distance of the plant relative to the plurality of light source;

a sound propagation device, the sound propagation device configured to record the height of the plant; and a control portion, the control portion configured to operatively connect to the plurality of light sources, the control portion further configured to regulate the powering on and off of the plurality of light sources and the lumen output of the plurality of light sources, the control portion further configured to operatively connect to the platform, the control portion further configured to regulate the position and orientation of the platform relative to the plurality of lights, the control portion further configured to operatively connect to the infrared sensing device, the control portion further configured to operatively connect to the sound propagation device, whereby the height of the plant, the distance of the plant relative the plurality of light sources, and the orientation of the plant relative to the plurality of light sources, at least partially determine operation of the plurality of light sources and the platform.

In another aspect, the system further comprises a communication device, the communication device configured to monitor the plant, the plurality of light sources, and the platform, the communication device further configured to communicate with the control portion for remotely controlling the plurality of light sources and the platform.

In another aspect, the communication device comprises a plurality of interfaces for viewing and controlling the system.

In another aspect, the communication device comprises a non-volatile memory card, the non-volatile memory card configured to store information collected by the control portion for at least one of the following: the plant, the plurality of light sources, the platform, energy consumption by the plurality of light sources, and at least one environmental condition of the plant.

In another aspect, the communication device is a smart phone.

In another aspect, the system further comprises a timer clock having day and night photoperiod, In another aspect, the system further comprises a thermostat for measuring ambient temperature.

In another aspect, the system further comprises at least one air sensor for measuring and logging relative humidity around the plant and $CO_2$ output by the plant.

In another aspect, the system further comprises a liquid control device for regulating watering of the plant.

In another aspect, the system further comprises an odor control fan for dispersing odors from the plant.

In another aspect, the system further comprises an image capturing device for capturing an image of the plant, light sources, platform, and proximal area around the plant.

In another aspect, the image capturing device is a Wi-Fi high definition camera configured to rotate 360 degrees.

In yet another aspect, the plurality of light sources comprises eight fluorescent 30 watt 6000K light bulbs.

In yet another aspect, the system further comprises a one hundred-twenty volt opto-isolated 8 relay board for operatively connecting the plurality of light sources to the control portion.

In yet another aspect, the plurality of light sources are configured to illuminate automatically and sequentially as the height of the plant increases.

In yet another aspect, the infrared sensing device comprises a 38 KHz infrared receiver configured to detect a minimum distance between the plurality of light sources and the plant.

In yet another aspect, the platform comprises at least one wheel, the at least one wheel configured to move the platform proximally and distally relative to the plurality of light sources.

In yet another aspect, the platform comprises a pulley and a belt, the pulley and the belt configured to rotate the platform.

In yet another aspect, the platform comprises a motor, the motor configured to operatively connect to the pulley through the belt, the motor further configured to rotate the pulley and/or the at least one wheel.

In yet another aspect, the motor is powered by an internal 12 volt 5 amp Direct Current power supply, and a 5 volt 1 amp Direct Current power supply.

In yet another aspect, the platform comprises a platter, the platter operatively connected to the pulley through a spindle, the platter configured to support the plant.

In yet another aspect, the platform comprises a low-voltage electrical connector.

It is one objective of the present invention to create optimal distribution of light for efficient photosynthesis conditions in the plant.

It is another objective to provide controlled lighting environment to produce a consistent crop in both quality and quantity day-after-day, regardless of season, at an affordable cost.

It is another objective to control a plant's distance and orientation to a light source.

It is another objective to enable remote operation and control of the function of powering on and off, and illuminating a lumen output of plurality of light sources on a plant.

It is another objective to enable remote operation and control of the distance and orientation of the plant relative to the light sources.

Yet another objective is to operate the powering on and off and lumen output of the light sources, and the position and orientation of the plant relative to the light sources, based on the height of the plant and at least one environmental condition.

Yet another objective is to integrate at least one environmental sensor in proximity to the plant.

Yet another objective is to reduce energy consumption by powering off the light sources that are not needed and reducing the lumen output as the height of the plant increases and the position and orientation of the plant is varied.

Yet another objective is to provide a cost effective lighting system for indoor growing of plants.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
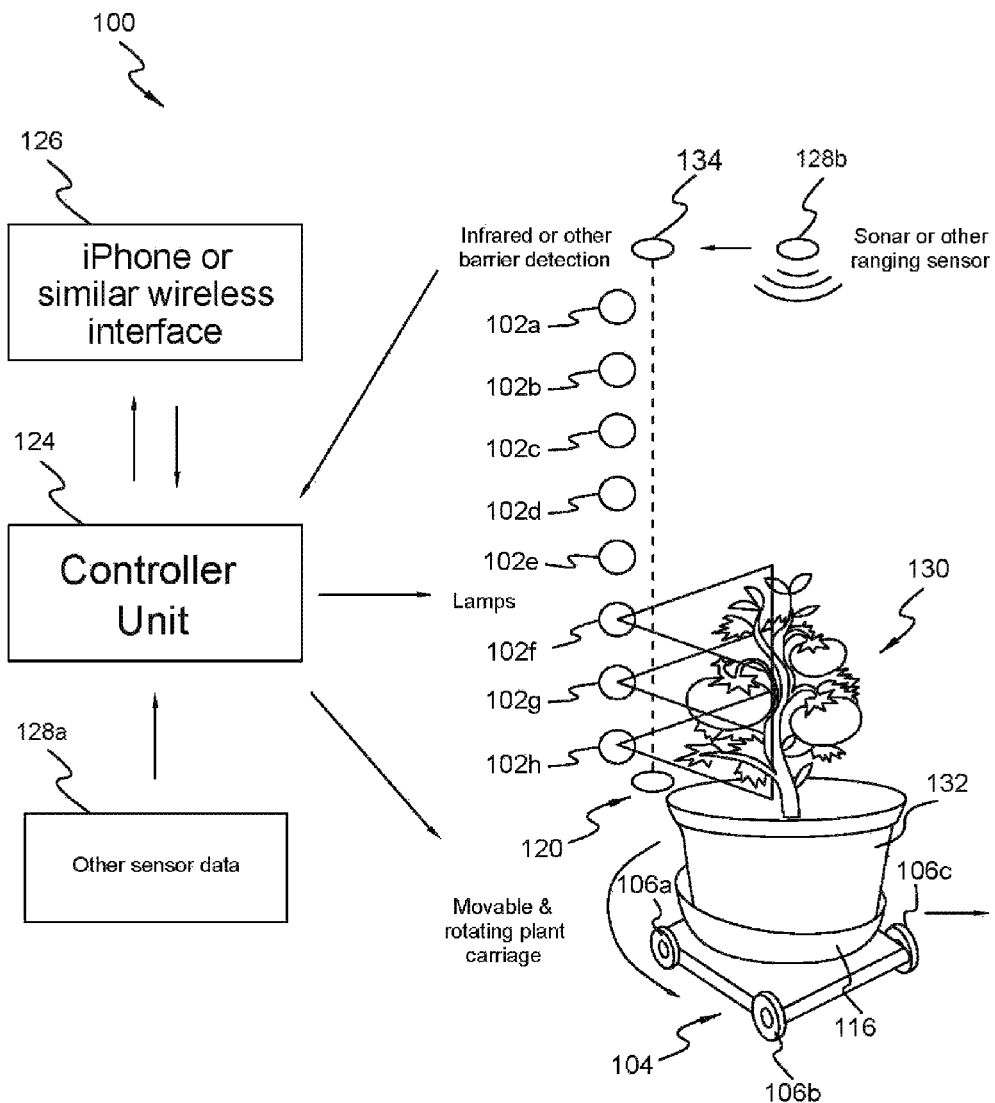
FIG. 1 illustrates a diagram of an exemplary system for optimal distribution of light on a plant, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1-14B illustrate a system 100 and method 200 for optimal distribution of light on a plant 130. System 100 and method 200 enables optimal distribution of light on a plant 130 to ensure that much of the plant 130 receives uniform light during growth, including shadow regions of plant 130 where light does not reach. A plurality of light sources 102a, 102b, 102c, 102d, 102e, 102f, 102g, 102h position along the length of the plant 130. The lumen output of light sources 102a-h is incrementally varied as plant 130 grows. Further, the position of the plant 130 relative to the light sources horizontally and rotatably incrementally adjusts on a platform 104 as the plant 130 grows.

Platform 104 moves the plant 130 horizontally relative to the plant 130. Platform 104 also rotates to orient the plant 130 toward the light. Principles of inverse square law are used to adjust the distance and orientation of the plant 130 relative to light sources 102a-h. Energy savings occur since lumen output and powering on of light sources 102a-h is adjustable to match plant 130 growth. At least one environmental sensor 128a, 128b monitors at least one environmental condition proximal to the plant 130, the height of plant 130, and the distance between the plant 130 and light source 102a-h. Environmental sensor 128a, 128b partially dictates operation of light sources 102a-h and the platform 104.

As referenced in FIG. 1, system 100 provides a plurality of light sources 102a-h that adjustably illuminate towards a plant 130. System 100 also includes a platform 104 that adjusts the distance and orientation of plant 130 relative to light sources 102a-h. The frequency at which the light sources 102a-h are powered on and off and the intensity at which the lumen output of the light sources 102a-h is variably controlled, and the movement and orientation of plant 130 relative to the light sources 102a-h is generally incremental. This incrementalism allows the plant 130 to react to light source 102a-h before the intensity and direction of illumination is varied. In one embodiment, illustrated in FIG. 2, light sources 102a-h fasten vertically in a spaced-apart relationship along a wall.

Thus, the controllable and incremental variance in lighting and plant positioning helps increase the growth rate of plant 130. In this manner, system 100 ensures that a substantial portion of plant 130 receives uniform and sufficient light during its growth, including light that reaches in regions of the plant 130 where shadows normally inhibit reception of light. This manipulated distribution of light creates optimal photosynthesis conditions in the plant 130.

In some embodiments, system 100 utilizes algorithmic calculations based on the inverse square law to adjust the lumen output (light intensity), and the position of the plant 130 relative to light sources 102a-h. System 100 also creates energy savings, since the intensity of the light is adjustable to match the growth of the plant 130. System 100 also monitors and records at least one environmental condition of the plant 130, the length of plant 130, and the distance of the plant 130 from light sources 102a-h.

Those skilled in the art will recognize that the goal of any controlled environment agriculture facility or grow room is to produce a consistent crop in both quality and quantity, day-after-day, regardless of season, and at an affordable cost. The key factor in achieving this goal is the plant 130's distance and orientation to the light. No other influence has a greater effect on a plant 130's ability to produce phenomenal yields than how the plant 130 is positioned under the light source.

Thus, system 100 controls: 1) the synchronization of light sources 102a-h that are powered on and off; 2) the lumen output of the light sources 102a-h; 3) the rotational position of the plant 130 relative to light sources 102a-h; and 4) the distance of the plant 130 relative to light sources 102a-h. In this manner, optimal light distribution on the plant 130 is achieved to create maximum photosynthesis conditions for stimulating plant growth. Furthermore, the amount of energy consumed is reduced since light sources 102a-h are not perpetually operational.

Figure 2:
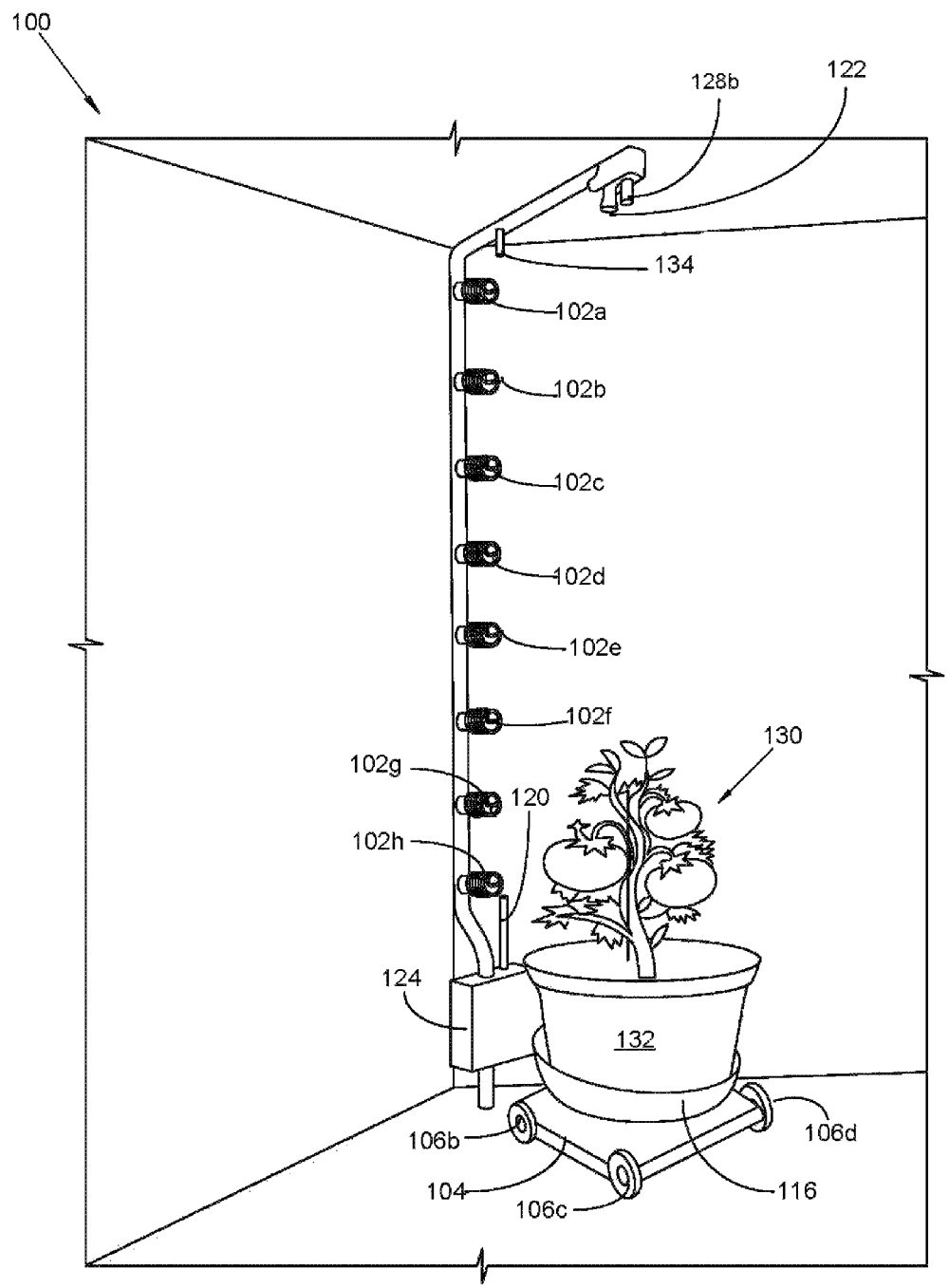
FIG. 2 illustrates a perspective view of an exemplary system for optimal distribution of light on a plant, in accordance with an embodiment of the present invention.

Looking now at FIG. 2, system 100 provides light sources 102a-h that align at an adjustable distance along the length of the plant 130. Light sources 102a-h are configured to illuminate automatically and sequentially as the height of the plant 130 increases. Light sources 102a-h may be placed parallel with the length of the plant 130, at a spaced-apart adjustable distance that is efficacious for stimulating plant 130 growth. Light sources 102a-h may be fastened to a wall or ceiling through any number of fasteners known in the art, including, without limitation, twisty ties, hooks, screws, bolts, magnets, magnets, and adhesives.

Each light source operates independently, such that the lumen output and the powering on and off of light sources 102a-h is synchronized with the growth of the plant 130. A communication device 126 may be used for adjusting the lumen output and power of the light sources 102a-h. In this manner, the lumen output and power of light sources 102a-h may be remotely regulated to adapt to the growth of the plant 130. Light sources 102a-h may include low wattage lamps. In one embodiment, light sources 102a-h comprise 8 fluorescent 30 watt, 6000K light bulbs.

In other embodiments of light sources, an LED technology may be used to deliver specific wavelengths of light to maximize utilization of the supplemental light for photosynthesis. By delivering light having one or more specific wavelengths, it is possible to use a light that consumes relatively little power, such as 10 watts, 8 watts, 6 watts, 4 watts or less, while providing sufficient supplemental light to facilitate healthy plant growth.

In some embodiments, the number of light sources 102a-h that are required for operation of system 100 may be dictated by generally accepted illumination standards for specific plants. However, the operating costs of system 100 are significantly lower than conventional systems since a portion of light sources 102a-h may be powered off, or operating a low lumen output, based on the height and position of the plant 130.

Those skilled in the art, in light of the present teachings, will recognize that a substantial component in the cost of lighting is in energy costs. To cut down on costs and also conserve energy it is desirable to maximize the use of light generated. Efficiency includes the lumen per watt of electricity conversion. The lumen per watt of electricity conversion equals the light flux which arrives at the surface of the plant 130, divided by the sum of all light flux of the light source, and the uniformity of the illuminance over an area expressed in a minimum or maximum ratio to the design level. Thus, the present invention is effective for powering on and off, and varying the lumen output of light sources 102a-h in synchronization with the growth of plant 130. This variation in lighting helps reduce energy consumption, and thereby the cost of lighting.

Figure 3:
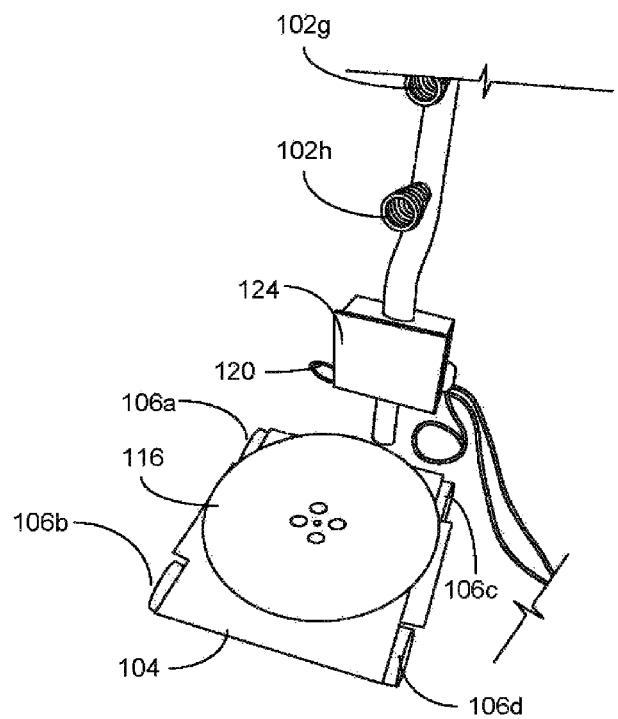
FIG. 3 illustrates a top angle perspective view of an exemplary platform adjacent to an exemplary light source, in accordance with an embodiment of the present invention.
Figure 4:
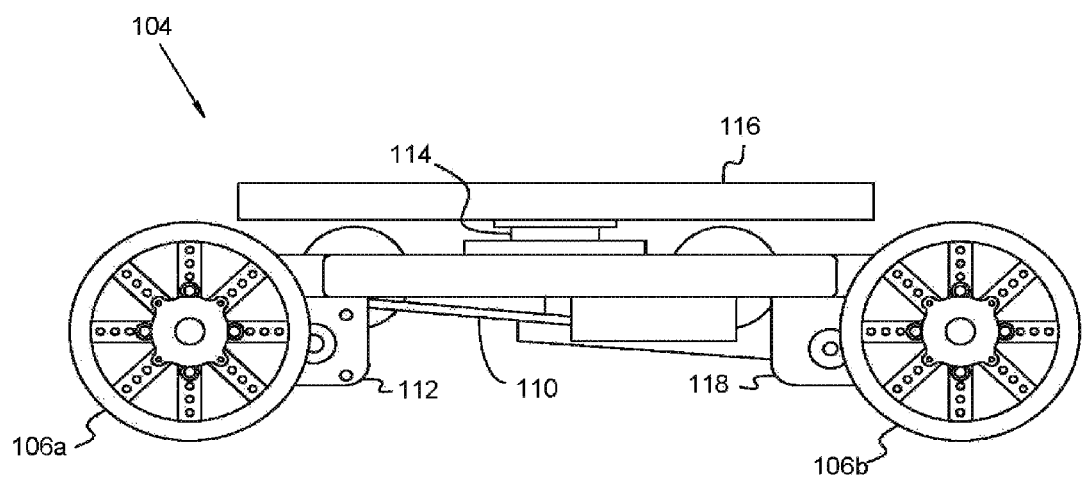
FIG. 4 illustrates a side view of a platform, in accordance with an embodiment of the present invention.

Turning now to FIG. 3, system 100 not only adjusts the lumen output and operation of the light sources 102a-h, but also adjusts the position of the plant 130 relative to the light sources 102a-h through an adjustable platform 104. Platform 104 supports the plant 130, moving proximally and distally relative to the plant 130, so as to partially dictate the amount of lighting that strikes the plant 130. As FIG. 4 illustrates, platform 104 also rotates to dictate the orientation of the plant 130 relative to light sources 102a-h. This is especially useful for distributing light to the lower regions of the plant 130 where shading inhibits light.

In some embodiments, plant 130 positions on platform 104 at a predetermined distance and at a predetermined orientation from light sources 102a-h. Platform 104 rotates and moves in a horizontal direction relative to the light sources 102a-h. In this manner, platform 104 manipulates the plant 130 during its growth based on the length of the plant 130 and the environmental condition conditions. By rotatably adjusting the position of the plant 130, the normally shaded regions of the plant 130 receive their share of light.

Figure 5:
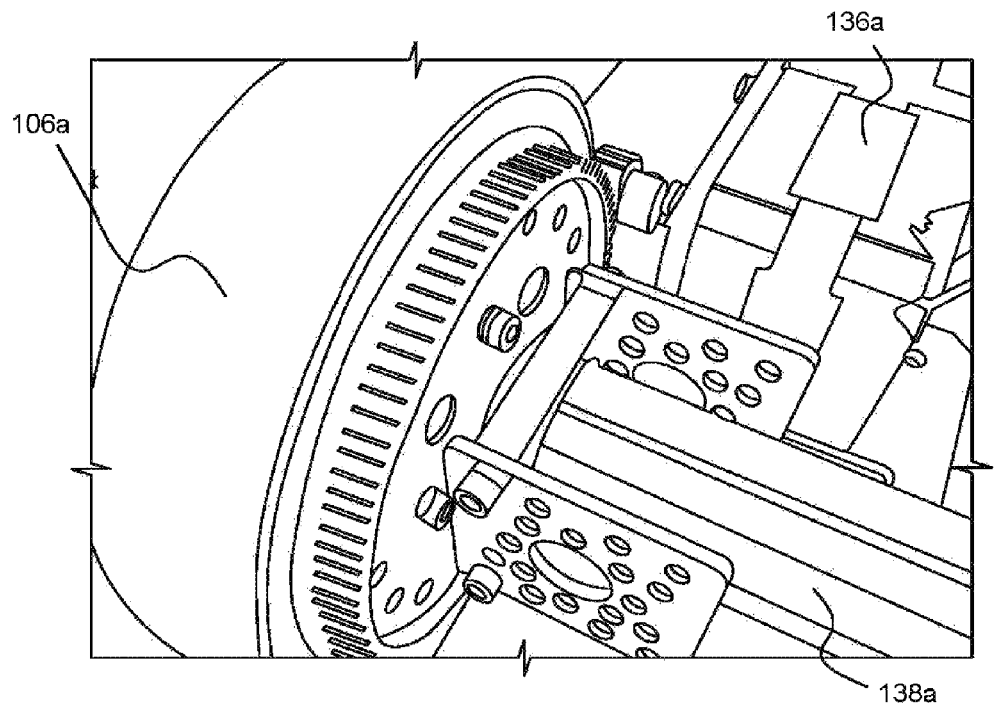
FIG. 5 illustrates a bottom view of a platform, in accordance with an embodiment of the present invention.
Figure 6:
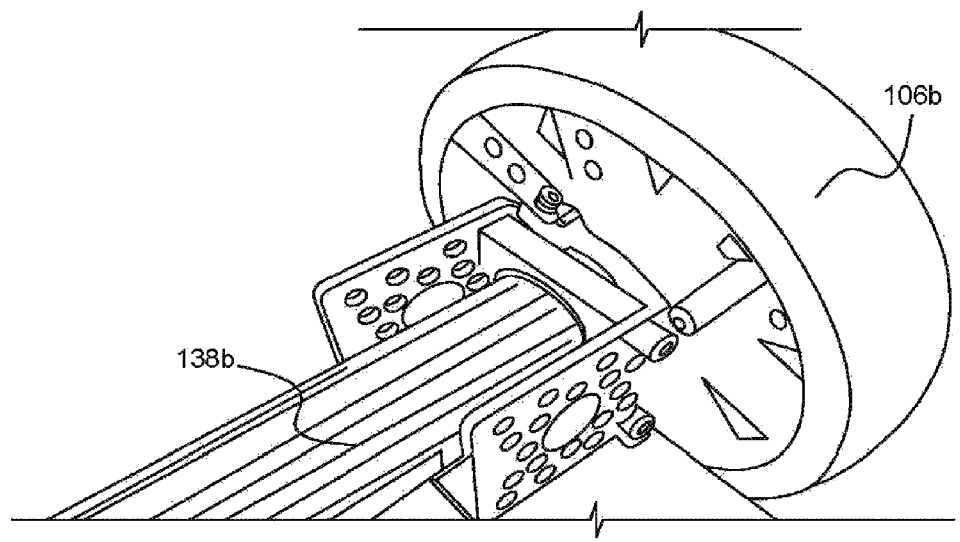
FIG. 6 illustrates a close up view of an exemplary pulley, in accordance with an embodiment of the present invention.

As illustrated in FIGS. 5 and 6, the platform may include at least one wheel 106a, 106b, 106c, 106d that is configured to move platform 104 proximally and distally relative to light sources 102a-h. For example, four wheels roll platform 104 horizontally next to the plant 130. In one embodiment, the at least one wheel 106a-d is a plastic wheel with rubber tread 4" diameter with an aluminum one hundred tooth, thirty-two pitch spur gear attached. In another embodiment, a pair of axles 138a, 138b extend between two opposite wheels 106a, 106b to carry the platform 104. At least one brake 136a, 136b may be controllable to lock wheels 106a-d.

Figure 7:
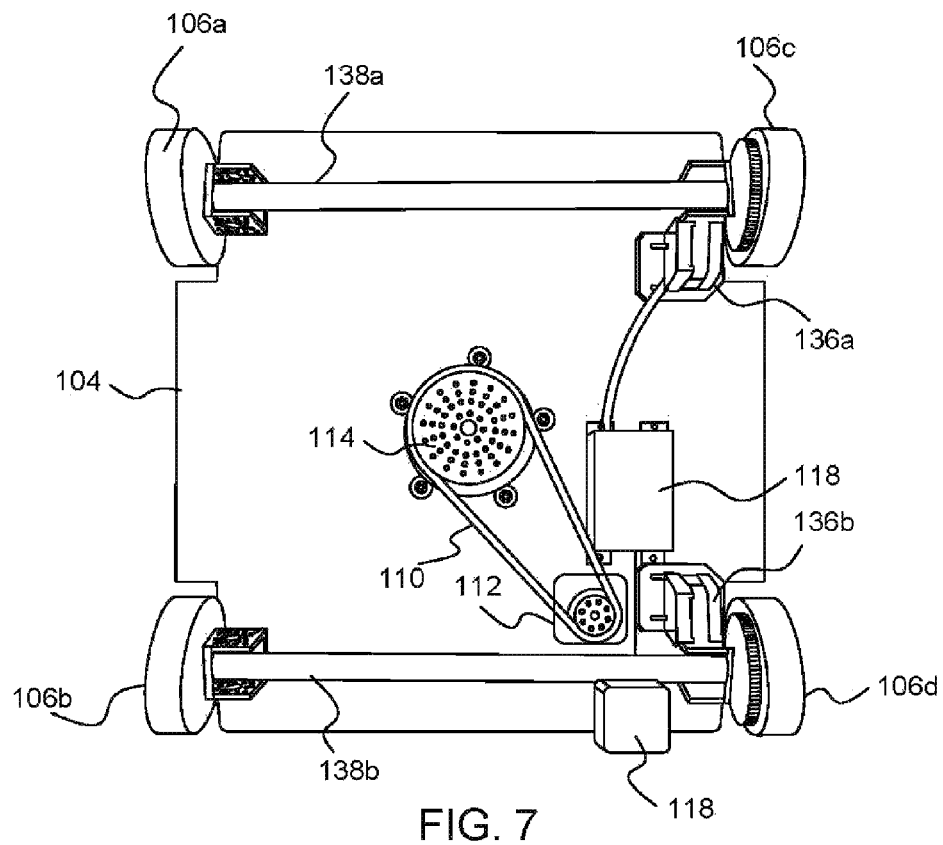
FIG. 7 illustrates a close up view of an exemplary left wheel, in accordance with an embodiment of the present invention.

As shown in FIG. 7, a platter 116 rotatably rests on platform 104. The plant 130 rests directly on platter 116. It is platter 116 that rotates plant 130 to the desired orientation relative to the light sources 102a-h. Plant 130 may be positioned inside a growing pot 132 while resting on the platter 116. In one embodiment, platter 116 is a round, rotating ¾" plywood platform attached to other end of a spindle 114. Spindle 114 may include an elongated support member that operatively connects a pulley 108 to platter 116 to enables rotation of platter 116.

Figure 8:
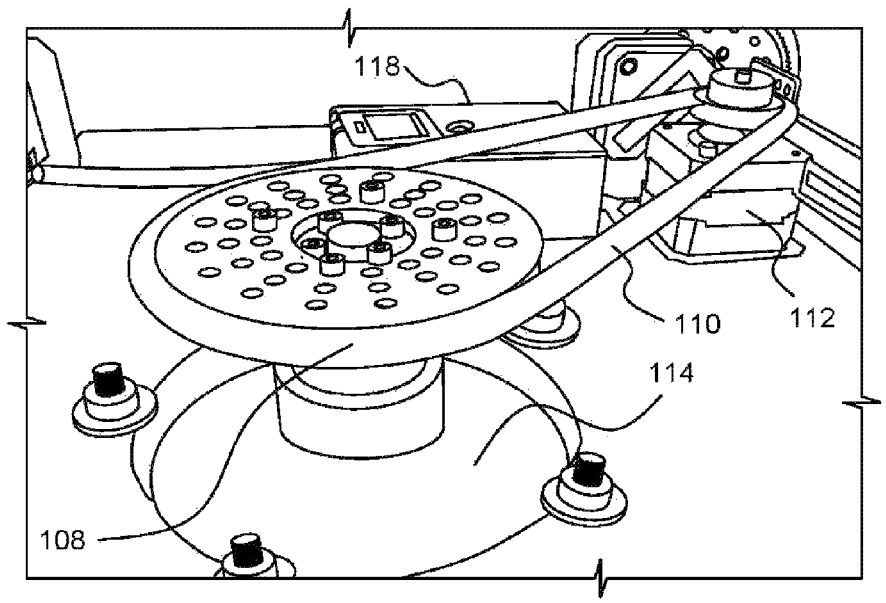
FIG. 8 illustrates a close up view of an exemplary right wheel, in accordance with an embodiment of the present invention.

Looking now to FIG. 8, platform 104 further comprises a pulley 108 and a belt 110 that are configured to rotate platform 104 in both directions and up to 360°. Pulley 108 may orient coplanar to platter 116. In one embodiment, pulley 108 is fabricated from aluminum and has a 3" diameter. Platform 104 may further include a motor 112 that is configured to operatively connect to pulley 108 through belt 110.

In one embodiment, motor 112 is used to rotate the pulley 108 for rotation of the platter 116 and/or the at least one wheel 106a-d. In one possible embodiment, motor 112 is a Nema 17 stepper motor with 16 tooth 32 pitch pinion gear attached. Motor 112 may be powered by an internal 12 volt 5 amp Direct Current power supply, and a 5 volt 1 amp Direct Current power supply. Platter 116 operatively connects to the pulley 108 through a spindle 114. A low-voltage electrical connector 118 may also be used to interconnect electrical components, such as electrical splices of motor wiring.

In one embodiment, system 100 utilizes principles of inverse square law to adjust the distance and orientation of plant 130 relative to light sources 102a-h. Those skilled in the art will recognize that the inverse square law dictates that the intensity of light radiating from light sources 102a-h that reaches the plant 130 is inversely proportional to the square of the plant's 130 distance from light sources 102a-h. Thus, the inverse-square law states that as the distance of plant 130 from the light source is increased, the light intensity is diminished relative to the square of the distance.

System 100 utilizes algorithmic calculations based on the inverse square law to ensure that the lumen output of the light sources 102a-h is adjusted appropriately, and the position of the plant 130 relative to the light sources 102a-h is rotatably and horizontally manipulated to achieve optimal light distribution. Further, the plant's 130 environmental condition, the length of plant 130, and the distance of plant 130 relative to the light sources 102a-h are constantly monitored and recorded by system 100, so as to help determine optimal lumen output and plant positioning.

By applying the inverse square law it is possible to compute how much light we do have and where. The known variables are: lumens (rated lamp output), and (fc) footcandles (measurement of light intensity), and distances. To illustrate the benefits of the system 100, an experimental plant growth is shown in which two identical 6' plants are grown. Plant A is grown under a standard artificial growth lamp known in the art, while Plant B is grown under the system 100 as taught here.

Plant A is grown under a 400 watt metal halide lamp placed overhead with a lamp rating of 32,000 lumens having a total wattage of 400 W.

Plant B is grown parallel with 8 spaced-apart fluorescent lamps light sources. The light sources have a lamp rating of 2000 lumens each for a total wattage of 240 W.

If lumens=foot-candles (fc) at a distance of 1 ft. This means that Plant A has 32000 fc at the top (minimum plant distance for these lamps is 1 ft. or vegetation burning will occur). However, Plant B has 2000 fc on the side receiving the light at a distance of 1 foot (but minimum plant distance for these lamps is only 1½", or 0.125 ft.).

Through application of the inverse square law, the amount of light is determined as the plants move closer and further from their respective light sources.

Plant A computes as follows:
32,000 fc at 1' (beginning value)
8,000 fc at 2' (distance doubled, so divide by 4)
2,000 fc at 4' (distance doubled, so divide by 4)
1000 fc at 6' (distance increased 50%, so divide by 2)
Plant B computes as follows:
128,000 fc at 1½" (distance halved, so multiply by 4)
32,000 fc at 3" (distance halved, so multiply by 4)
8,000 fc at 6" (distance halved, so multiply by 4)

2,000 fc at 1' (beginning value)

1,000 fc at 1½' (distance increased by 50%, so divide by 2)

Thus, it is apparent that at minimum distances, the quantity of light just at the top of Plant A is equivalent to the side of Plant B. Yet Plant B uses substantially less wattage than Plant A. The lamp-to-plant distance is effective for maximum energy consumption efficiency. Furthermore, the vertical arrangement of light sources 102a-h for Plant B permit a closer proximity to the plant where lumen output is greatest. This provides greater light distribution to the plant.

Turning back to FIG. 1, system may further include an infrared sensing device 120 to monitor and record the position of plant 130 relative to the light sources 102a-h. Infrared sensing device 120 communicates with a receiver 134, so as to determine the distance between the outer reaches of the plant 130 and the light sources 102a-h. Platform 104 may be operated based on this communicative data between infrared sensing device 120, and receiver 134. In one embodiment, infrared sensing device 120 comprises a 38 KHz infrared receiver that emits a light beam towards receiver 134. Infrared sensing device 120 is configured to detect a minimum distance between light sources 102a-h and plant 130.

In one embodiment, infrared sensing device 120, and receiver 134 can be adjusted laterally at a predetermined distance to calibrate distance between plant 130 and light sources 120a-h. Thus, infrared sensing device 120, and receiver 134 establish the minimum distance the plant positions relative to light sources 120a-h. As plant 130 rotates and grows in diameter, it interrupts a light beam from infrared sensing device 120, causing platform 104 to incrementally move distally from light sources 120a-h until the light beam reengages receiver 134.

System 100 may further include a sound propagation device 122 for detecting the height of the plant 130. Sound propagation device 122 may include, without limitation, a sonar detector that bounces sound waves off the top of the plant 130 to determine maximum height. This data may be used to regulate the lumen output of light sources 102a-h and the distance of the plant 130 from light sources 102a-h.

As illustrated back in FIG. 2, the system 100 further comprises a control portion 124 that regulates light sources 102a-h and platform 104 in synchronization with the growth of the plant 130. Control portion 124 is also in communication with, and in control of at least one environmental sensor 128a, 128b. The at least one environmental sensor 128a, 128b is configured to detect and record at least one environmental condition proximal to the plant 130. Environmental sensor 128a, 128b may include, without limitation, a timer clock, a thermostat, at least one air sensor, a fan, and an image capturing device. Thus, control portion 124 is in communication with, and in control of: light sources 102a-h, platform 104, and environmental sensor 128a, 128b.

However, in one alternative embodiment, the timer clock regulates operation of light sources 102a-h, platform 104, and environmental sensor 128a, 128b. For example, platform 104 moves incrementally away from light sources 102a-h once a week, and rotates 360° over a 24 hour period.

In some embodiments, control portion 124 may include, without limitation, a chip, analogue electronics, or computer, which monitors and physically alters the operating conditions of light sources 102a-h and platform 104, and various sensors and thermostats. Control portion 124 may comprise any of power conditioning, computer processing, data storage, and communications systems.

In one exemplary control portion 124, an on-board micro controller determines the number and order of light sources 102a-h that operate, based on plant height. This may include a one hundred-twenty volt opto-isolated 8 relay board for operatively connecting the plurality of light sources 102a-h to the control portion 124. In another exemplary use of the control portion 124, automate robotic functions of platform 104 are controlled to move and rotate the plant 130 as needed to maintain minimum distance and orientation relative to light sources 102a-h. The functions of control portion 124 may be controlled and monitored wirelessly using communication device 126.

In some embodiments, control portion 124 is configured to communicate with a communication device 126, such as a smart phone, and specifically an iPhone™. In one possible use, communication device 126 may download a software application that enables the display of numerous interfaces for regulating and monitoring various aspects of system 100 and the plant 130. In one embodiment, communication device 126 may enable remote control light sources 102a-h and platform 104. In another embodiment, control portion 124 may send messages to communication device 126 to indicate operational problems and dangerous plant environmental condition conditions.

In one embodiment, communication device 126 operates with a non-volatile memory card, configured to store information collected by control portion 124 for at least one of the following: the plant 130, light sources 102a-h, the platform 104, energy consumption by light sources 102a-h, and the environmental condition of the plant 130. Thus, data collected from control portion 124 may be logged onto an on-board SD card slot is graphed on communication device 126 for daily viewing.

As discussed above, control portion 124 is in communication with, and in control of at least one environmental sensor. The environmental sensor is configured to detect and record at least one environmental condition proximal to plant 130. The at least one environmental sensors may include at least one of the following:

A timer clock is used for timing operations. As discussed above, the timer clock helps regulate operation of light sources 102a-h, platform 104, and at least one environmental sensor 128a, 128b. The timer clock may be configured to operate in day and night photoperiods.

A thermostat for measuring ambient temperature. The thermostat is useful for determining various needs of plant 130. In some embodiments, temperature monitoring of the environmental condition of plant 130 is performed by having thermistors in various locations in the Root Zone. By having sensors in various locations, an average can be calculated and the temperature of the Root Zone can be accurately monitored and controlled. The thermostat measures ambient temperature in the proximity of plant 130.

At least one air sensor may be utilized for measuring and logging relative humidity around the plant 130 and $CO_2$ output by the plant 130. Those skilled in the art will recognize that humidity monitoring is of high importance as this provides a snapshot of the status of the root system. Low humidity signals that the roots may be drying out. Changes in relative humidity can be monitored, for example, by a capacitive type hygrometer. The at least one air sensor measures and records relative humidity around the plant 130 and $CO_2$ output by the plant 130.

In some embodiments, a fan may be used for dispersing odors from the plant 130. The fan may oscillate to provide optimal air flow. The fan may power on and off as needed. In some embodiments, within the path of the air flow from the fan are the ambient sensors. i.e., temperature, humidity, $CO_2$, and other components of the system that may require cooling.

An image capturing device may be used for capturing an image of the plant 130, light sources 102a-h, platform 104, and proximal area around the plant 130. The image capturing device may include a Wi-Fi high definition camera. In some embodiments, images of the plant 130, light sources 102a-h, and platform 104 that captured by the image capturing device may be viewed through the communication device 126. The image capturing device is used for capturing an image of the plant 130, light sources 102a-h, platform 104, and proximal area around the plant 130. In one possible embodiment, the image capturing device is a Wi-Fi high definition camera configured to rotate 360°.

In some alternative embodiments, a liquid control device is used to apply a liquid, such as water or fertilizer directly on the plant 130. The liquid control device is operatively connected to the regulating watering of the plant 130. The liquid control device regulates watering of the plant 130 to compensate for changes in humidity. The liquid control device may include piping and water distribution outlets.

In other embodiments, a primary failure detection instrument (e.g. a water sensing circuit) may monitor the system 100. If the system 100 fails, a backup system becomes operable. The backup system (e.g. a drip system) ensures nutrients reach the Root Zone during primary system downtime, as there is no soil acting as a nutrient reserve for the plant 130 to tap.

In some embodiments, control portion 124 may be manufactured using two main models: a master, and a slave. The master may be completely self-contained, as shown in FIG. 1. The slave may include a simpler strip-down version, only controlling the light sources 102a-h and the platform 104, while responding to the master.

FIGS. 9-13 reference details of multiple user interfaces 900, 1000, 1100, 1200, 1300 that appear on the communication device for facilitated communication and control of the control portion 124. In one exemplary embodiment of the communication device interfaces 900, 1000, 1100, 1200, 1300, an application runs on an iOS™ device. The application is designed for users to build custom interfaces on an iPhone™ that communicate with an Arduino integrated development environment, i.e., the control portion 124. In this case, the Arduino Mega 2560 model is used with an Ethernet and other shields, sensors, and robotic components to accomplish the control tasks.

Figure 9:
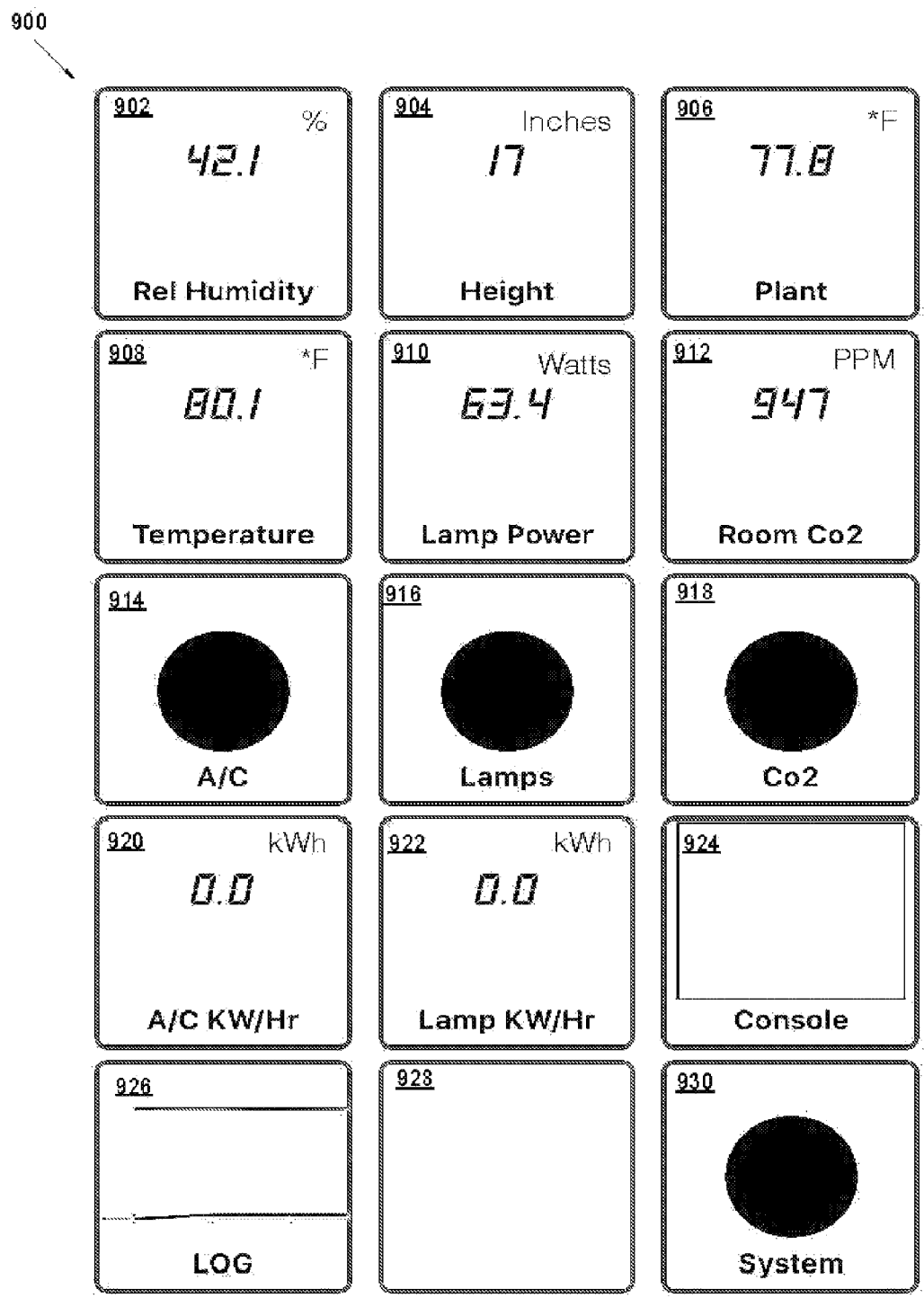
FIG. 9 illustrates a first page interface that displays controls and environmental conditions in real-time, in accordance with an embodiment of the present invention.

FIG. 9 illustrates a first page interface 900 that displays controls and environmental conditions in real-time. In one embodiment, the first page interface 900 comprises at least one of the following: an indicator 902 for calculated relative humidity as recorded by the air sensor; an indicator 904 for plant height as recorded by the sound propagation device 122; an indicator 906 for non-contact infra-red temperature of the plant as recorded by the infrared sensing device 120; an ambient room temperature indicator 908 (also used to calculate RH); an indicator 910 for calculated total lamp watts, which is obtained from a current sensor and a fifth page interface 1300 shown below; and an indicator 912 for ambient $CO_2$ concentration in parts per million.

The first page interface 900 further displays an indicator 914 light for air-conditioning on/off power, status, and error indication; an indicator 916 light for source on/off power, status, and error indication; an indicator 918 light for $CO_2$ on/off power, status, and error indication; an indicator 920 for air-conditioning (cumulative per session) kilowatts/hour; an indicator 922 for lamps (cumulative per session) kilowatts/hour; an indicator 924 for error and trouble statements reported here (and emailed); an indicator 926 for daily log, showing a scrollable graph of pertinent sensors data each minute; a reserved indicator 928 for future functions; and an indicator 930 for light Status, error, auto and manual override indication.

Figure 10:
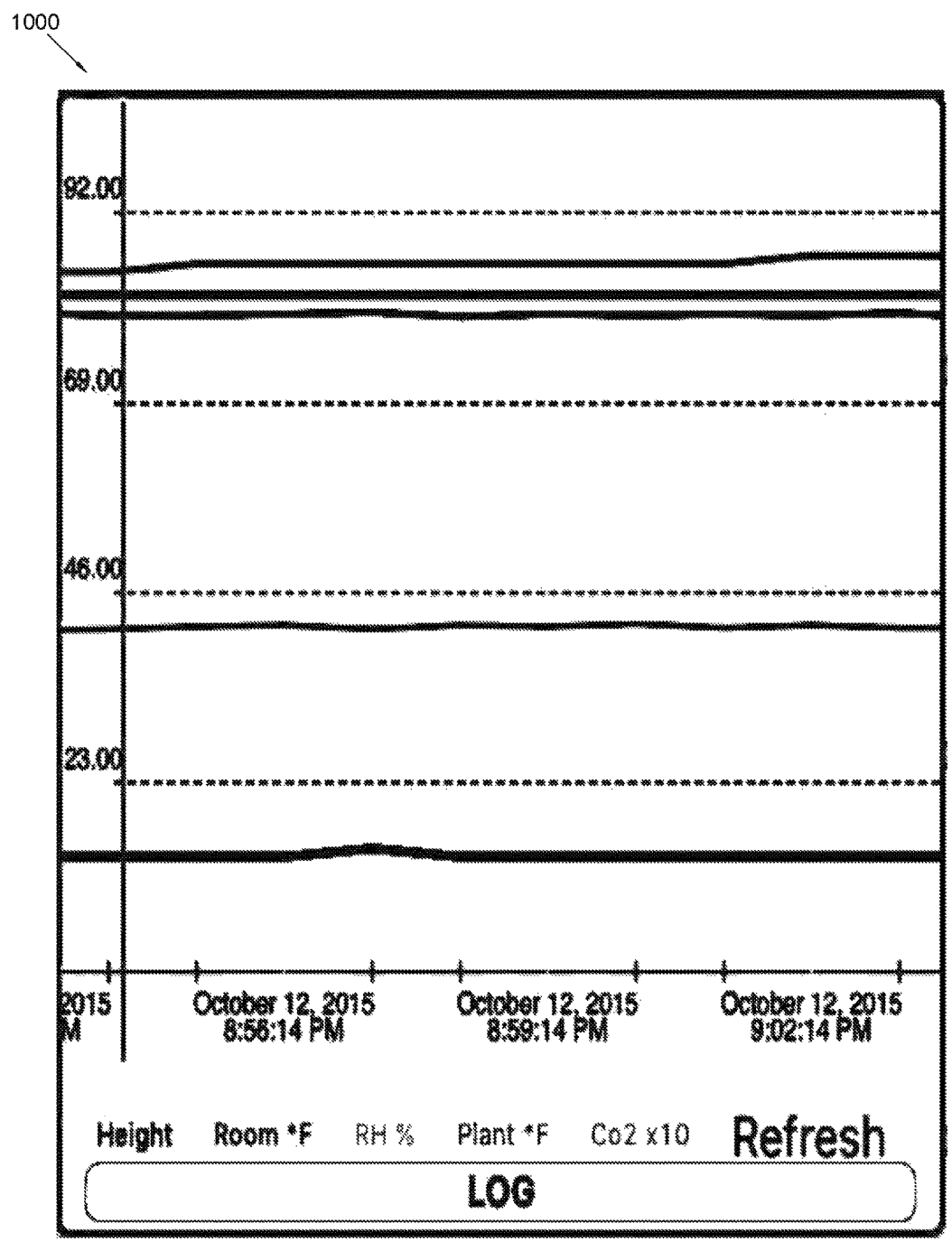
FIG. 10 illustrates a second page interface that generates a daily log of the at least one environmental condition in real-time, recorded over a duration of time, in accordance with an embodiment of the present invention.

FIG. 10 illustrates a second page interface 1000 that generates a daily log of the at least one environmental condition in real-time, recorded over a duration of time. In one embodiment, the second page interface 1000 shows the environmental conditions of the plant, including the plant height, ambient temperature, humidity, and the like. In one exemplary use, double tapping the screen on the communication device displays the second page interface 1000 in an enlarged view. This shows multiple days of environmental conditions. For example, a full day of environmental condition data acquisition (every minute) is stored in a file on a SD card in the communication device. At start of each day (or by pressing 1306, discussed below, this data is cleared.

Additional separate files may also be created on the same SD card, which contains an accumulation of this data, plus energy consumption data (kilowatts/hour) of lamps and air-conditioning for the entire session for later analysis in a spreadsheet. An onboard battery backup, shown in 1328 below, assures logging continuity in the event of a power failure. The SD card can be removed from the communication device and inserted into a typical computer for this, at which time the user may delete these files from the card to begin a new plant.

Figure 11:
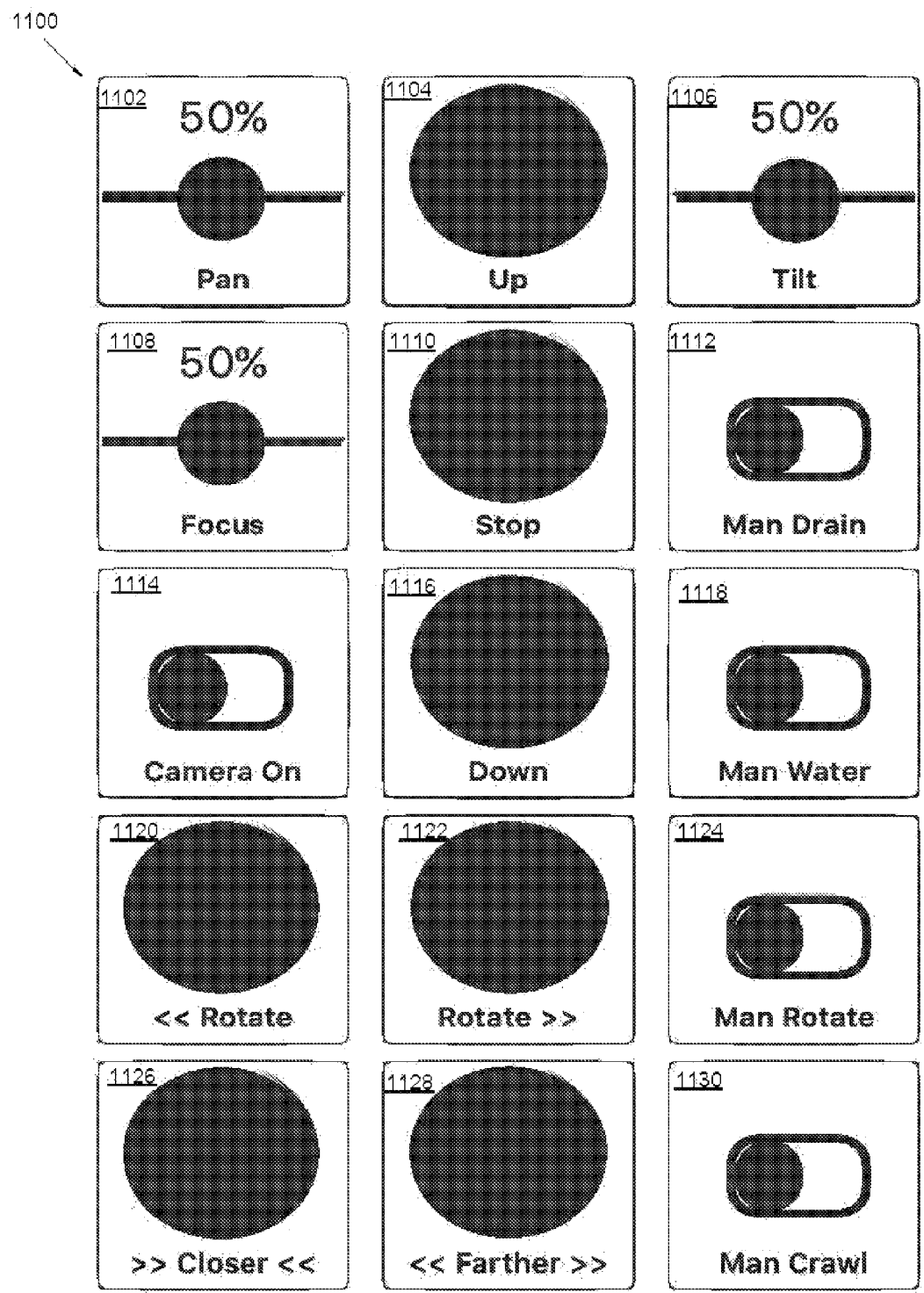
FIG. 11 illustrates a third page interface that displays indicators and switches for controlling the platform, the image capturing device, and the liquid control device, in accordance with an embodiment of the present invention.

FIG. 11 illustrates a third page interface 1100 that displays indicators and switches for controlling the platform 104, the image capturing device, and the liquid control device. In one embodiment, the third page interface 1100 comprises at least one of the following: an input 1102 slide variable resistor for pan servo on future camera attachment; an input 1104 push-button for up vertical travel of future camera attachment; an input 1106a-d Slide variable resistor for tilt servo on future camera attachment; an input 1108 Slide variable resistor for focus servo on future camera attachment; an input 1110 Push-button to stop vertical travel of future camera attachment.

The third page interface 1100 further displays an input 1112 Power on/off to drain solenoid on future water reservoir attachment; an input 1114 Power on/off to future camera attachment; an input 1116 Push-button for down vertical travel of future camera attachment; an input 1118 Power on/off to fill solenoid on future water reservoir attachment; input 1120 Push-button for manual left rotation of plant on platform 104; input 1122 Push-button for manual right rotation of plant on carriage attachment; input 1124 Push-button for manual rotation of platform 104; input 1126 Push-button for proximal manual travel of platform 104; input 1128 Push-button for distal manual travel of platform 104; and an input 1130 Switch on/off automatic travel of platform 104.

Figure 12:
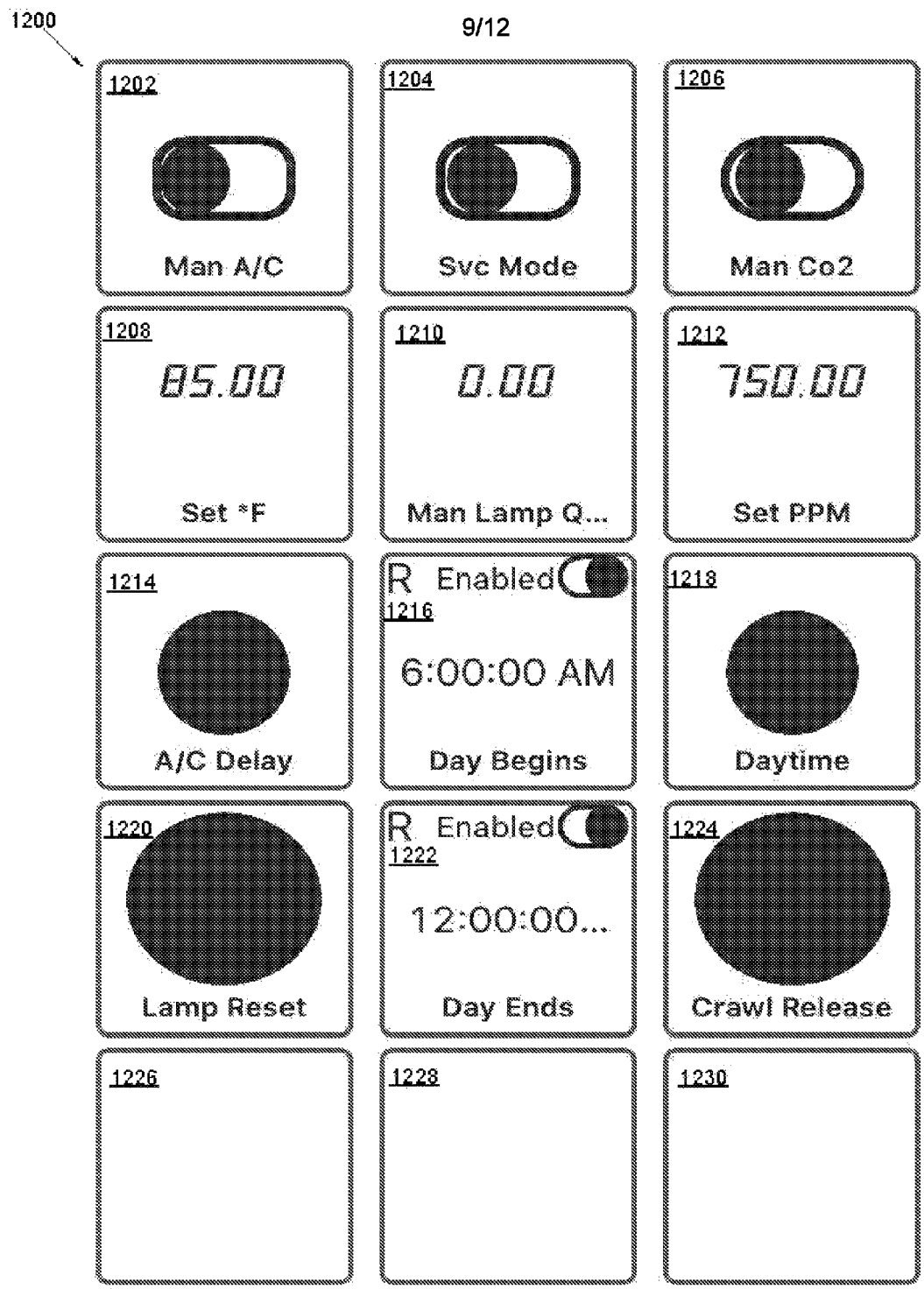
FIG. 12 illustrates a fourth page interface that displays indicators and switches for controlling the platform, the image capturing device, and the liquid control device, in accordance with an embodiment of the present invention.

FIG. 12 illustrates a fourth page interface 1200 that displays indicators and switches for controlling the platform 104, the image capturing device, and the liquid control device. In one embodiment, the fourth page interface 1200 comprises at least one of the following: an input 1202 Air-conditioning manual over-ride when in service mode; an input 1204 Service mode on/off control for over-riding automatic functions; an input 1206 $CO_2$ solenoid manual over-ride when in service mode; an input 1208 Set desired room temperature for air-conditioning; an input 1210 Manual over-ride of desired quantity of lamps to activate The fourth page interface 1200 further displays an input 1212 Set desired concentration of CO2; a switch 1214 for light air-conditioning delayed start in effect when blinking; an input 1216 Set desired time of day to start photoperiod; an indicator 1218 for light photoperiod (daytime) in effect when lit; an input 1220 Push-button used for testing lamps while in service mode; an input 1222 Set desired time of day to end photoperiod; an input 1224 Push-button dynamic brake release for physical plant adjustment; and multiple reserved spaces 1226, 1228, 1230 for future functions.

Figure 13:
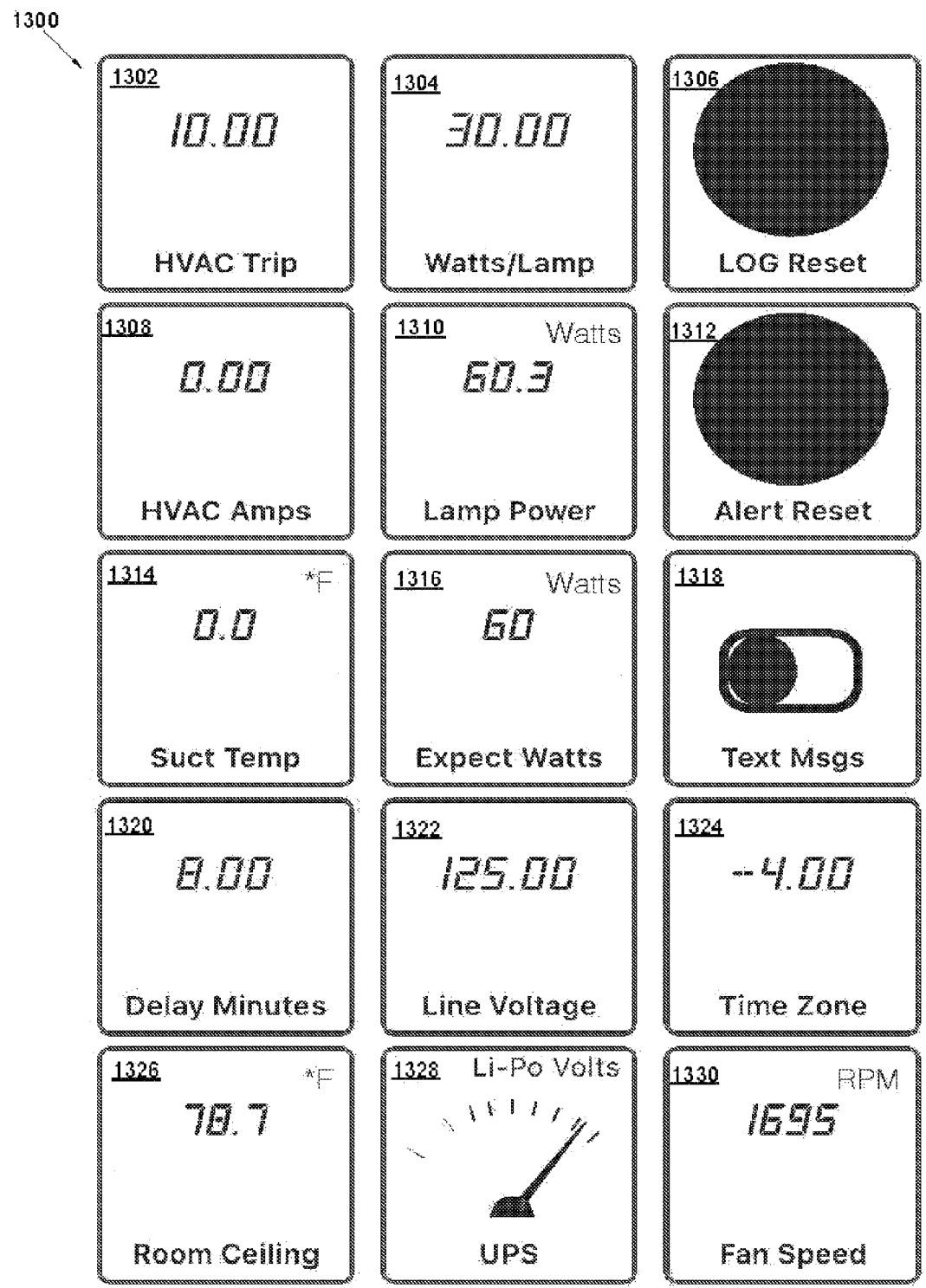
FIG. 13 illustrates a fifth page interface that displays indicators and switches for controlling the platform, the image capturing device, and the liquid control device, in accordance with an embodiment of the present invention.

FIG. 13 illustrates a fifth page interface 1300 that displays indicators and switches for controlling the platform 104, the image capturing device, and the liquid control device. In one embodiment, the fifth page interface 1300 comprises at least one of the following: an input 1302 Set desired maximum air-conditioning amperage before error; an input 1304 Set individual lamp nameplate wattage; an input 1306 Push-button clears daily log of the second page interface 1000; an indicator 1308 of real-time air-conditioning amperage; and an indicator 1310 of real-time lamp amperage total.

The fifth page interface 1300 further displays an input 1312 push-button that manually resets alerts; an indicator 1314 of real-time air-conditioning suction line temperature; an indicator 1316 of expected watts from lamp quantity times nameplate watts; a switch 1318 text message (or email) status and error reports sending on/off; a set display 1320 for desired air-conditioning compressor restart delay; a set display 1322 for existing known line (mains) voltage; a set display 1324 for time zone, which affects cumulative session logs only; an indicator 1326 of real-time temperature of ceiling area of a room; an indicator 1328 of real-time voltage of backup battery charge condition; and an indicator 1330 of real-time speed of the fan. It is also significant to note that within the path of the air flow from the fan are the ambient sensors. i.e., temperature, humidity, $CO_2$, and other components of the system 100 that may require cooling.

Figure 14A:
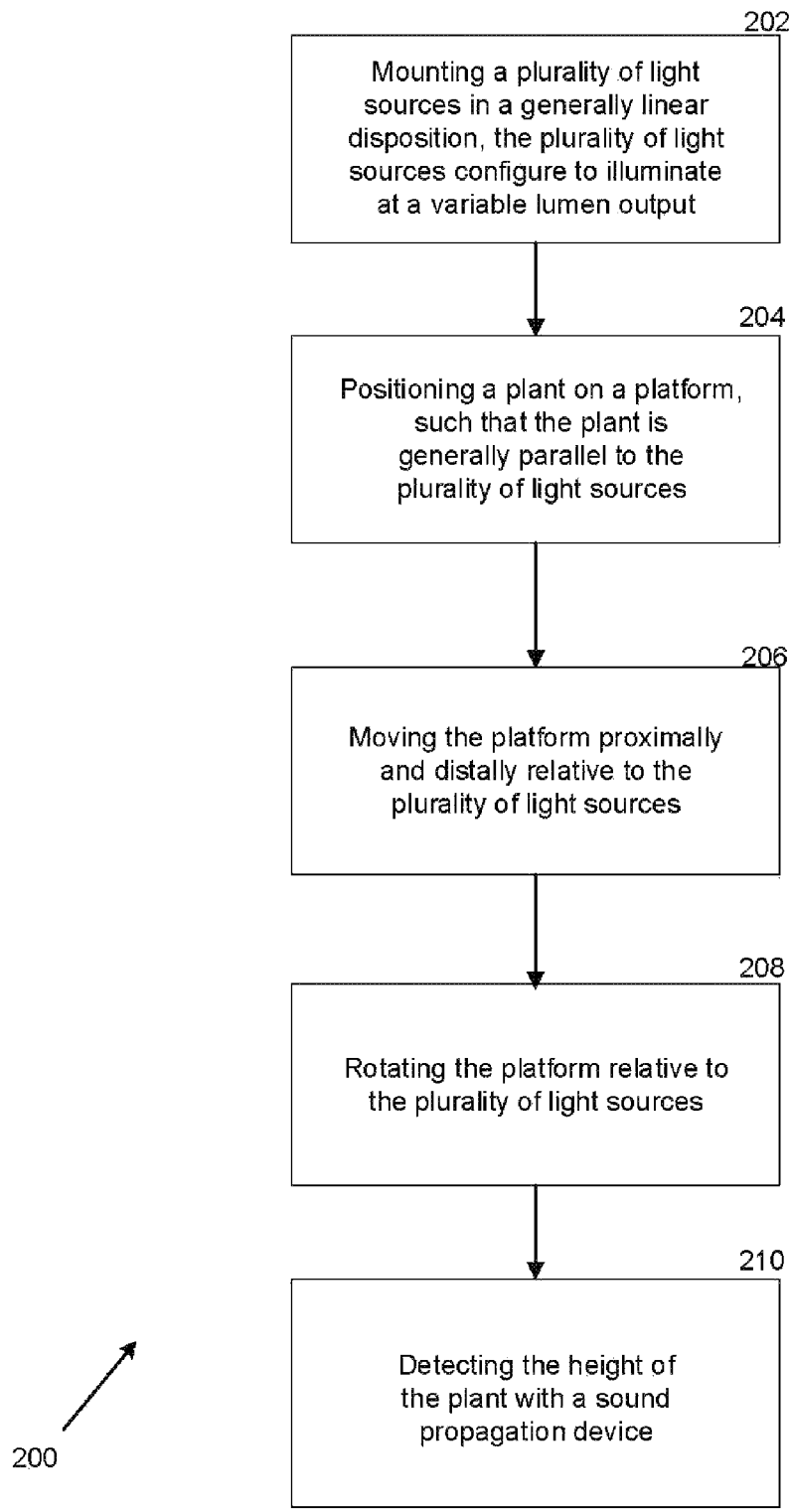
FIGS. 14A and 14B illustrate flowchart diagrams for an exemplary method for optimal distribution of light on a plant, in accordance with an embodiment of the present invention.
Figure 14B:
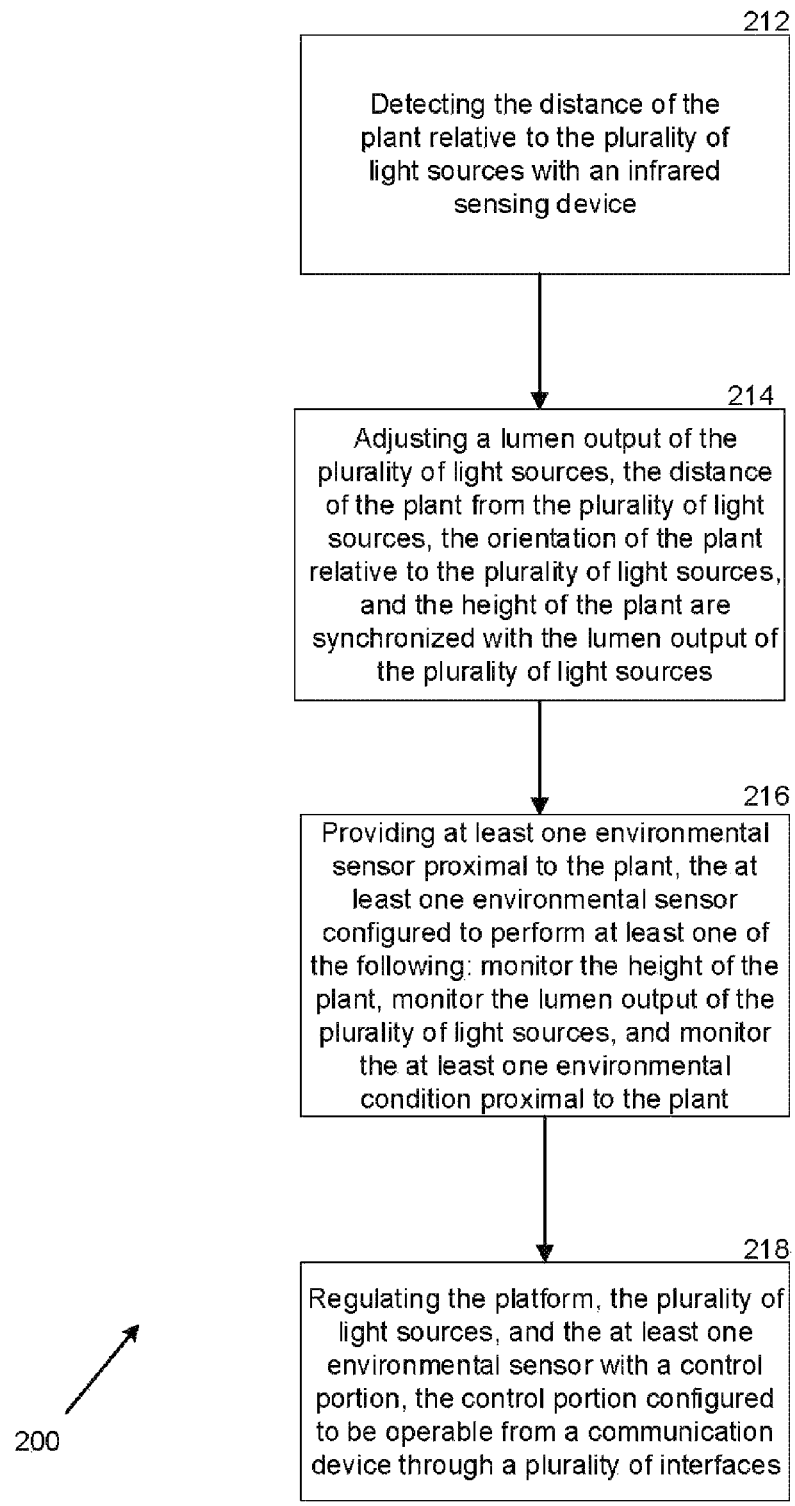

FIGS. 14A and 14B reference a method 200 for optimal distribution of light on a plant. The method 200 is configured to enable alignment of a plurality of light sources 102*a-h* along the length of a plant, and remotely enable the light intensity and position of the plant to be synchronized with the growth, i.e. changing height of the plant. In this manner, the method helps achieve optimal light distribution on the plant, optimal photosynthesis, and deficient consumption of energy during the growth of the plant.

The method 200 enables optimal distribution of light on a plant to ensure that much of the plant receives uniform light during growth, including shadow regions of the plant where light does not reach. A plurality of light sources 102*a-h* position along the length of the plant. The lumen output of the light sources 102*a-h* is incrementally varied as the plant grows.

Further, the position of the plant relative to the light sources horizontally and rotatably incrementally adjusts on a platform 104 as the plant grows. The platform 104 moves the plant horizontally relative to the plant. The platform 104 also rotates to orient the plant toward the light. Principles of inverse square law are used to adjust the distance and orientation of the plant relative to the light sources 102*a-h*.

Further, energy savings occur since lumen output and powering on of the light sources 102*a-h* is adjustable to match plant growth. At least one environmental sensor monitors at least one environmental condition proximal to the plant, the height of the plant, and the distance between the plant and the light source 102*a-h*. The environmental sensor partially dictates operation of the light sources 102*a-h* and the platform 104.

An initial Step 202 of the method 202 comprises mounting a plurality of light sources 102*a-h* in a generally linear disposition, the plurality of light sources 102*a-h* configured to illuminate at a variable lumen output. Light sources 102*a-h* are configured to illuminate automatically and sequentially as the height of the plant increases. The light sources 102*a-h* may be placed parallel with the length of the plant, at a spaced-apart adjustable distance that is efficacious for stimulating plant growth. Light sources 102*a-h* may be fastened to a wall or ceiling through any number of fasteners known in the art, including, without limitation, twisty ties, hooks, screws, bolts, magnets, magnets, and adhesives.

The method 200 may further comprise a Step 204 of positioning a plant on a platform 104, such that the plant is generally parallel to the plurality of light sources 102*a-h*. The plant may include and vegetative organism that requires light for photosynthesis. In one embodiment, the plant grows in a growing pot and rests on a platter 116 of the platform.

A Step 206 includes moving the platform 104 proximally and distally relative to the plurality of light sources 102*a-h*, such that the plant is generally parallel to the plurality of light sources 102*a-h*. Platform 104 may include at least one wheel 106*a-d* that is configured to move the platform 104 proximally and distally relative to the plurality of light sources 102*a-h*. For example, four wheel 106*a-ds* roll platform 104 horizontally next to the plant.

In some embodiments, a Step 208 comprises rotating the platform 104 relative to the plurality of light sources 102*a-h*. In some embodiments, a platter 116 rotatably rests on the platform 104. The plant rests directly on the platter 116. It is platter 116 that rotates the plant to the desired orientation relative to the light sources 102*a-h*. The plant may be positioned inside a growing pot while resting on the platter 116. In one embodiment, platter 116 is a round, rotating ¾" plywood platform 104 attached to other end of a spindle 114.

A Step 210 of the method 200 may include detecting the height of the plant with a sound propagation device 122. Sound propagation device 122 may include, without limitation, a sonar detector that bounces sound waves off the top of the plant to determine maximum height. This data may be used to regulate the lumen output of light sources 102*a-h* and the distance of the plant from light sources 102*a-h*.

In some embodiments, a Step 212 may include detecting the distance of the plant relative to the plurality of light sources 102*a-h* with an infrared sensing device 120. Infrared sensing device 120 is configured to monitor and record the position of the plant relative to the light sources 102*a-h* by communicating with a receiver 134. The infrared sensing device 120 detects the infrared light emanating from the plant, so as to determine the distance between the outer reaches of the plant and light sources 102*a-h*.

A Step 214 comprises adjusting a lumen output of the plurality of light sources 102*a-h*, the distance of the plant from the plurality of light sources 102*a-h*, the orientation of the plant relative to the plurality of light sources 102*a-h*, and the height of the plant are synchronized with the lumen output of the plurality of light sources 102*a-h*. The frequency at which intensity at which the lumen output of light sources 102*a-h* is variably controlled is generally incremental. This incrementalism allows the plant to react to light source 102*a-h* before the intensity and direction of lighting is varied.

A Step 216 may include providing at least one environmental sensor proximal to the plant, the at least one environmental sensor configured to perform at least one of the following: monitor the height of the plant, monitor the lumen output of the plurality of light sources 102*a-h*, and monitor the at least one environmental condition proximal to the plant. The environmental sensor is configured to detect and record at least one environmental condition proximal to the plant.

A final Step 218 comprises regulating the platform 104, the plurality of light sources 102*a-h*, and the at least one environmental sensor with a control portion 124, the control portion 124 configured to be operable from a communication device through a plurality of interfaces. Control portion 124 is in communication with platform 104, the plurality of light sources 102*a-h*, and the at least one environmental sensor for synchronizing: 1) the number of operational light sources; 2) the lumen output of the light sources; 3) the rotational position of the plant relative to the light sources; and 4) the distance of the plant relative to the light sources. In this manner, optimal light distribution on the plant is achieved to create maximum photosynthesis conditions for stimulating plant growth.

These and other advantages of the invention will be further understood and appreciated by those skilled in the art by reference to the following written specification, claims and appended drawings.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A system for optimal distribution of light, the system comprising:
   a plurality of light sources, the plurality of light sources disposed in a spaced-apart relationship configured to enable a generally parallel alignment with a plant, each light source configured to power on and off independently, each light source further configured to independently generate a variable lumen output,
   whereby the powering on and off of the plurality of light sources, and the lumen output of the plurality of light sources is based at least partially on the height of the plant;
   a platform, the platform configured to enable support of the plant, the platform further configured to move proximally and distally relative to the plurality of light sources, the platform further configured to rotate relative to the plurality of light sources,
   whereby the platform carries the plant proximally and distally in relation to the plurality of light sources based at least partially on the height of the plant,
   whereby the platform rotatably orients the plant in relation to the plurality of light sources based at least partially on the height of the plant;
   an infrared sensing device, the infrared sensing device configured to record the distance of the plant relative to the plurality of light source;
   a sound propagation device, the sound propagation device configured to record the height of the plant; and
   a control portion, the control portion configured to operatively connect to the plurality of light sources, the control portion further configured to regulate the powering on and off of the plurality of light sources and the lumen output of the plurality of light sources, the control portion further configured to operatively connect to the platform, the control portion further configured to regulate the position and orientation of the platform relative to the plurality of lights, the control portion further configured to operatively connect to the infrared sensing device, the control portion further configured to operatively connect to the sound propagation device,
   whereby the height of the plant, the distance of the plant relative the plurality of light sources, and the orientation of the plant relative to the plurality of light sources, at least partially determine operation of the plurality of light sources and the platform.

2. The system of claim 1, further comprising at least one environmental sensor, the at least one environmental sensor configured to detect and record at least one environmental condition proximal to the plant.

3. The system of claim 2, wherein the at least one environmental sensor includes at least one member selected from the group consisting of: a timer clock, a thermostat, at least one air sensor, a fan, and an image capturing device.

4. The system of claim 3, further comprising a communication device, the communication device configured to communicate with the at least one environmental sensor, whereby the communication device enables remote monitoring and operation of the plurality of light sources and the platform.

5. The system of claim 4, wherein the communication device comprises a plurality of interfaces for monitoring and controlling the plant and the at least one environmental condition proximal to the plant.

6. The system of claim 5, wherein the communication device comprises a non-volatile memory card, the non-volatile memory card configured to store information collected by the control portion for at least one of the following: the plant, the plurality of light sources, the platform, energy consumption by the plurality of light sources, and the at least one environmental condition proximal to the plant.

7. The system of claim 6, wherein the timer clock is defined by a day and night photoperiod.

8. The system of claim 7, wherein the thermostat is configured to measure ambient temperature proximal to the plant.

9. The system of claim 8, wherein the at least one air sensor is configured to measure and record relative humidity proximal to the plant, the at least one air sensor further configured to measure and record $CO_2$ output by the plant.

10. The system of claim 9, wherein the fan is configured to help disperse odors from the plant.

11. The system of claim 10, wherein the image capturing device is configured to capture an image of at least one of the following: the plant, the plurality of light sources, the platform, and a proximal area around the plant.

12. The system of claim 1, further comprising a liquid control device, the liquid control device configured to provide liquid to the plant based at least partially on the recoding of the at least one environmental sensor.

13. The system of claim 1, wherein the infrared sensing device comprises a 38 KHz infrared receiver configured to detect a minimum distance between the plurality of light sources and the plant by emitting a light beam towards a receiver.

14. The system of claim 1, wherein the platform comprises at least one wheel, the at least one wheel configured to move the platform proximally and distally relative to the plurality of light sources.

15. The system of claim 14, wherein the platform comprises a pulley and a belt, the pulley and the belt configured to rotate the platform.

16. The system of claim 15, wherein the platform comprises a motor, the motor configured to operatively connect to the pulley through the belt, the motor further configured to rotate the pulley and/or the at least one wheel.

17. The system of claim 16, wherein the platform comprises a platter, the platter operatively connected to the pulley through a spindle, the platter configured to support the plant.

18. The system of claim 17, wherein the platform comprises a low-voltage electrical connector.

19. A system for optimal distribution of light, the system comprising:
a plurality of light sources, the plurality of light sources disposed in a spaced-apart relationship configured to enable a generally parallel alignment with a plant, each light source configured to power on and off independently, each light source further configured to independently generate a variable lumen output,
whereby the powering on and off of the plurality of light sources, and the lumen output of the plurality of light sources is based at least partially on the height of the plant;
a platform, the platform configured to enable support of the plant, the platform further configured to move proximally and distally relative to the plurality of light sources, the platform further configured to rotate relative to the plurality of light sources,
whereby the platform carries the plant proximally and distally in relation to the plurality of light sources based at least partially on the height of the plant,
whereby the platform rotatably orients the plant in relation to the plurality of light sources based at least partially on the height of the plant;
an infrared sensing device, the infrared sensing device configured to record the distance of the plant relative to the plurality of light source;
a sound propagation device, the sound propagation device configured to record the height of the plant;
a control portion, the control portion configured to operatively connect to the plurality of light sources, the control portion further configured to regulate the powering on and off of the plurality of light sources and the lumen output of the plurality of light sources, the control portion further configured to operatively connect to the platform, the control portion further configured to regulate the position and orientation of the platform relative to the plurality of lights, the control portion further configured to operatively connect to the infrared sensing device, the control portion further configured to operatively connect to the sound propagation device,
whereby the height of the plant, the distance of the plant relative the plurality of light sources, and the orientation of the plant relative to the plurality of light sources, at least partially determine operation of the plurality of light sources and the platform;
at least one environmental sensor, the at least one environmental sensor configured to detect and record at least one environmental condition proximal to the plant, the at least one environmental sensor consisting of:

a thermostat, the thermostat configured to measure ambient temperature proximal to the plant;
at least one air sensor, the at least one air sensor configured to measure and record relative humidity proximal to the plant, the at least one air sensor further configured to measure and record $CO_2$ output by the plant;
a fan, the fan configured to help disperse odors from the plant;
an image capturing device, the image capturing device configured to capture an image of the plant, the plurality of light sources, the platform, and a proximal area around the plant; and
a communication device, the communication device configured to communicate with the at least one environmental sensor, whereby the communication device enables remote monitoring and operation of the plurality of light sources and the platform based on at least one of the following: the height of the plant, the distance of the plant relative the plurality of light sources, the orientation of the plant relative to the plurality of light sources, and the recordings of the at least one environmental sensor.

20. A method for optimal distribution of light, the method comprising:
mounting a plurality of light sources in a generally linear disposition, the plurality of light sources configure to illuminate at a variable lumen output;
positioning a plant on a platform, such that the plant is generally parallel to the plurality of light sources;
moving the platform proximally and distally relative to the plurality of light sources;
rotating the platform relative to the plurality of light sources;
detecting the height of the plant with a sound propagation device;
detecting the distance of the plant relative to the plurality of light sources with an infrared sensing device;
adjusting a lumen output of the plurality of light sources, the distance of the plant from the plurality of light sources, the orientation of the plant relative to the plurality of light sources, and the height of the plant are synchronized with the lumen output of the plurality of light sources;
providing at least one environmental sensor proximal to the plant, the at least one environmental sensor configured to perform at least one of the following: monitor the height of the plant, monitor the lumen output of the plurality of light sources, and monitor the at least one environmental condition proximal to the plant; and
regulating the platform, the plurality of light sources, and the at least one environmental sensor with a control portion, the control portion configured to be operable from a communication device through a plurality of interfaces.

* * * * *